United States Patent [19]

Durbin et al.

[11] 4,250,538

[45] Feb. 10, 1981

[54] FULL FRAME FLASH ILLUMINATION SYSTEM UTILIZING A DIFFUSE INTEGRATING OPTICAL CAVITY

[75] Inventors: John A. Durbin, Webster; James D. Rees, Pittsford, both of N.Y.

[73] Assignee: Xerox Corporation, Stamford, Conn.

[21] Appl. No.: 15,558

[22] Filed: Feb. 26, 1979

[51] Int. Cl.³ ............................................. G09F 13/04
[52] U.S. Cl. ..................................... 362/97; 362/263; 355/67
[58] Field of Search ............................. 362/33, 98, 97; 355/263, 67

[56] References Cited

U.S. PATENT DOCUMENTS 4,071,882  1/1978  Dennis .................................... 362/97

Primary Examiner—Stephen J. Lechert, Jr.

[57] ABSTRACT

An illumination system for a document copying machine including an optical cavity having interior walls coated with a white, diffusely reflecting material. One end of the cavity contains a platen for positioning document to be copied while the opposing end contains a lens for forming an image of the document on a light sensitive image plane. Illumination from a single flash illumination source located within the cavity, undergoes multiple reflections from the walls resulting in a uniform diffuse illumination of the document.

10 Claims, 3 Drawing Figures

FULL FRAME FLASH ILLUMINATION SYSTEM UTILIZING A DIFFUSE INTEGRATING OPTICAL CAVITY

BACKGROUND OF THE INVENTION

The present invention relates generally to an illumination system in a document copying machine and more particularly, to a full-frame, flash illumination system utilizing an integrating cavity as the light housing.

As demands for faster copying and duplicating have increased, conventional machines which scan documents in incremental fashion to provide a flowing image on a xerographic drum have proved inadequate. New high speed techniques have evolved which utilize flash exposure of an entire document (full-frame) and the arrangement of a moving photoconductor in a flat condition at the instant of exposure.

PRIOR ART STATEMENT

In prior art flash illumination systems, the illumination at the document plane can be generally characterized as either wholly specular, or partially specular, partially diffuse. U.S. Pat. Nos. 3,777,135; 3,586,849 and 3,669,538 are typical or optical systems of the former type. In each of the disclosed systems, light from a plurality of flash lamps is directly reflected, by means of reflective elements partially enclosing the lamps, toward the object to be illuminated, i.e. a document lying on a platen. Light reflected from the document passes through a lens to be focused onto the image plane. However, a significant portion of the light generated by the light source is absorbed by the housing walls or passes out of the illumination area prior to, and following incidence on, the platen. These illumination losses reduce the amount of light reaching the lens and, therefore, to achieve adequate exposure, a plurality of high intensity light sources utilizing large and costly power supplies are required.

Significant gains in illumination efficiency can be obtained if the light sources are enclosed within an integrating cavity whose walls are made of, or coated with, a nearly diffuse reflecting material. The theoretical implications of diffusely illuminating an object by causing multiple reflections within an "integrating sphere is set forth in Principles of Optics, pp. 278–283, (McGraw Hill, 1932)." It is therein disclosed that, if the interior wall of a sphere is coated with a white, diffusely reflecting material with high reflectance, multiple reflections within the sphere produce an almost uniform diffuse illumination of an object plane. Copier illumination systems as disclosed in U.S. Pat. Nos. 3,697,177 (Booth); 3,498,715 (Gold) and 3,428,397 (Elmer) have attempted to utilize this principle with varying degrees of success. A diffusely reflecting integrating cavity has also been used to achieve uniform fixing of a developed zerographic image as disclosed in U.S. Pat. No. 3,529,129 (Rees).

The Gold and Elmer references are representative of optical systems which illuminate an object plane with light that is both diffuse and specular. In Gold, a pair of lamps are partially enclosed by baffles with reflective interiors. The lamps directly illuminate the object plane with increased illumination directed towards the end of the support by the baffles and by diffuse reflecting surfaces located above the lamps. The housing, however, is not a true integrating cavity since the chamber is not wholly enclosed and many areas are blackened to achieve the specific purposes set forth in the disclosure.

Elmer also uses a pair of lamps partially enclosed by specular reflective elements. A pair of side walls opposite the reflectors provide a first primary diffuse reflection of light from the opposing light source. The end walls provide a second specular reflection of the diffuse incident thereon. This arrangement provides illumination at the object plane which is substantially diffuse and with greater intensity at the edges.

The Booth reference has a pair of light sources which are contained in the upper compartment of a two chamber cavity. Direct rays from the light sources are prevented from going through the lens by making the bottom chamber of narrowed cross-section so the top edges intercept the direct rays. The interior housing walls are coated with a diffuse reflecting material except for a darkened area on one of the walls. The object plane is illuminated by direct light from the lamps and diffuse illumination after multiple reflections from the cavity walls.

The present invention utilizes a single flash lamp located in an integrating cavity, the lamp having a relatively short length. Uniform diffuse illumination is provided at a document plane of sufficient intensity to obtain satisfactory imaging at a photoreceptor. The invention, in effect, fully realizes and utilizes the superior irradiance efficiency permitted by a properly designed integrating cavity. The lamp, in one embodiment, is partially enclosed by a blocker element which serves to prevent light flashes from being viewed above the platen. An additional blocker element is positioned between the lamp and the lens for purposes hereinafter described.

It will be appreciated that use of a single flash light source of relatively small dimensions yields significant savings relative to prior art elongated, multi-lamp configurations. Savings in power supply costs and mounting and reflector arrays are obtained. Lower voltage operating conditions may permit use of relatively inexpensive electrolytic capacitors. Simplicity of design is achieved since the single light source can be optimized independent of the cavity and can be easily manufactured because of non-critical tolerances.

SUMMARY OF THE INVENTION

It is therefore an object of this invention to increase the efficiency of optical systems by using a single flash lamp source within an integrating cavity chamber.

It is a further object to simplify design and manufacture of the flash system components.

It is a still further object to provide a flash illumination system which prevents direct flashes from being visible to an operator in an open platen mode of operation.

These objects are accomplished according to the invention by providing an enclosed light housing having top and bottom surfaces accommodating a document platen and lens respectively, and having connecting side walls, the interior surfaces of said housing being completely coated with a high, diffusely, reflective material. A single illumination source positioned in a first embodiment within the housing is intermittently pulsed and the flash illumination, after undergoing one or more substantially diffuse reflections from the housing walls, uniformly and diffusely irradiates the platen.

DESCRIPTION OF THE PREFERRED EMBODIMENT

Figure 1:
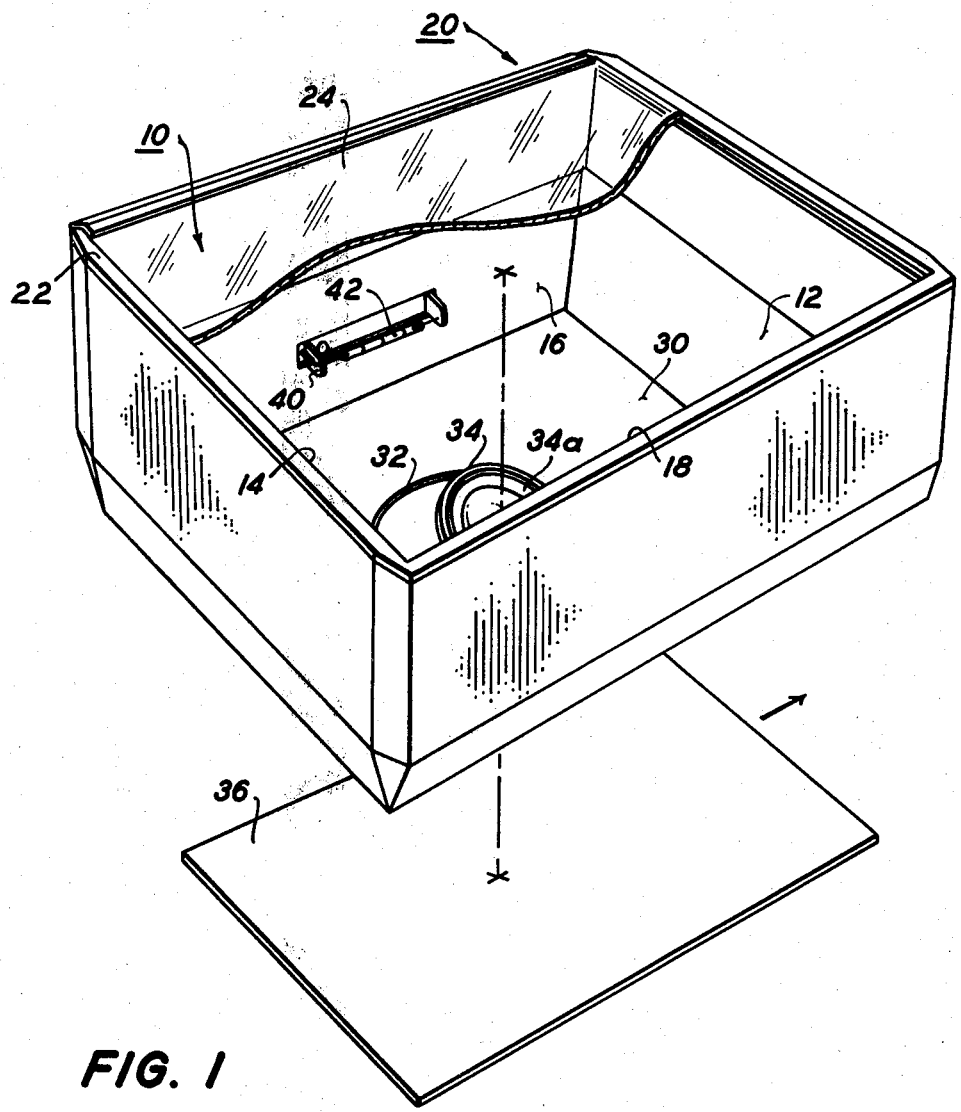
FIG. 1 is a perspective view of the illumination housing of the present invention showing the single flash lamp configuration.
Figure 2:
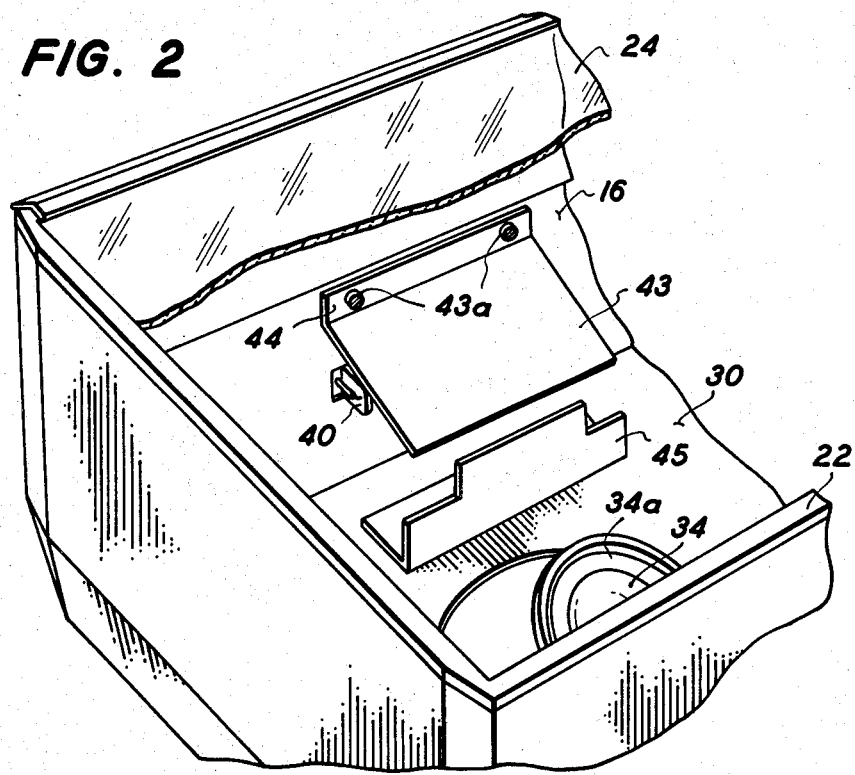
FIG. 2 is a perspective partial view of the housing showing a preferred blocker element arrangement.

Referring now to the drawings, FIGS. 1 and 2 illustrate a first embodiment of an integrating optical cavity containing a single flash lamp according to the invention.

A completely enclosed housing 10, generally rectangular in shape, has a first pair of opposing side walls 12, 14 and a second pair of opposing side walls 16, 18. An upper, or top wall 20 includes a rectangular aperture 22 which, at the center thereof, accommodates a glass platen 24 forming the object plane. the platen may have a hinged cover (not shown) which may be pivoted upward to permit open platen copying of materials such as books.

The lower, or bottom, wall 30 has an aperture 32 therein which accommodates a circular lens housing 34. An image plane 36 which may be, for example, a photoconductive sheet to which a charge has been applied is positioned for exposure to light reflected from a document platen 24 and transmitted by lens 34. the projected light image selectively discharges the photoconductive sheet resulting in formation of a latent electrostatic image thereon.

Mounted in the lower half of side wall 16 by bracket 40 is flash illumination source 42, which is of relatively short length compared to the platen length in the same direction. Source 42 in a preferred embodiment is a lamp consisting of an envelope containing Xenon gas and a pair of electrodes at each end which are not electrically connected to each other. The lamp is connected to pulsing triggering circuitry (not shown) which may consist of a DC power supply connected across a storage capacitor which in turn is connected to the flash lamp through an inductor. When the pulsing circuit is activated, the lamp undergoes a gas breakdown resulting in a flash of appropriate duration. In operation, the lamp is periodically energized in timed relation to the movement of image plane 36 past the lens.

The interior walls of the cavity (12, 14, 16, 18, and 30) have substantially diffuse reflecting surfaces resulting from coating the interior wall surfaces with a high reflectivity (90%) material. Paints such as Celanese polyester thermal setting paint No. 741-13 or Glidden Enamel No. 424-W-02100 in cellosolve acetate thinner have been found to be acceptable materials.

Barrel 34a of lens housing 34 is similarly coated. The surfaces of the platen may be coated, if desired with an anti-reflection material such as $M_gF_2$ or a multi-layer anti-reflective material. As is well known in the art, this material will prevent any platen-derived specular reflection from entering the lens.

According to the present invention, and as shown in FIG. 2, a first blocker element 43 is mounted above lamp 42 and secured to wall 16 by screws 43a fastened through end portion 44. Blocker 43 projects at a slight downward angle relative to wall 16 and is of sufficient width and length to prevent direct light from lamp 42 from being viewed from any portion of platen 24. The top and bottom surfaces of blocker 43 may be coated with the same diffusely reflective material as that applied to the cavity interior.

A second thin blocker element 45 is secured to bottom wall 30 and projects upwardly and laterally a sufficient distance to prevent direct light from lamp 42 from reaching lens 34. Element 45 is of generally rectangular shape except for the omission of the upper corners.

The surfaces of blocker 45 may be coated with the same reflecting material which comprises the coating for the internal cavity walls.

Referring again to FIG. 2, an efficient flash illumination system is realized when utilizing a Xenon lamp with an overall length of between 12.7 and 17.8 cm and producing a nominal energy of 40 joules at a wavelength of 400 to 700 nm. The lamp, as shown, is mounted approximately ⅓ the height of wall 16 but other locations are possible dependent upon system requirements (so long as the lamp remains outside of the lens field of view). As a practical matter, the closer the lamp is mounted to the top surface of the housing the more difficult it becomes to provide uniform illumination at the surface of the platen overlying the blocker 43.

Blocker elements 43 and 45 can be constructed of any light weight opaque material such as aluminum. The purpose of blocker 43 is to protect an operator from direct flash illumination in situations where the job requirements call for an open platen. The blocker should therefore be of sufficient length and width to completely block a view of the lamp from any point on the platen. The function of blocker 45 is two-fold: to prevent direct light from lamp 42 from entering the lens and for preventing a "hot spot" of intense illumination from forming. The "hot spot", in the absence of the blocker would result from the direct light striking in front of the lens surface by light reflecting downward from the bottom of blocker 43.

It may be desirable, for certain applications, that blockers 43 and/or 45 be translucent. For example, when documents having a relatively large amount of grey background areas are to be copied, the light reflecting from these dark areas only partially discharge the charge on the photoreceptor image plane. The image of opaque blocker element 44 reflected from the partially reflecting platen is in these circumstances, visable as a superimposition on the partially discharged image plane. Making the blocker translucent greatly reduces the unwanted blocker image.

Because of the relatively close positioning of blockers 43 and 45 to the lamp, the diffusely reflecting surfaces facing the lamp may, for some systems, inefficiently direct light to the interior walls. It may, therefore, be desirable to make the blocker surfaces facing the lamp of a specular reflecting material such as polished aluminum.

Figure 3:
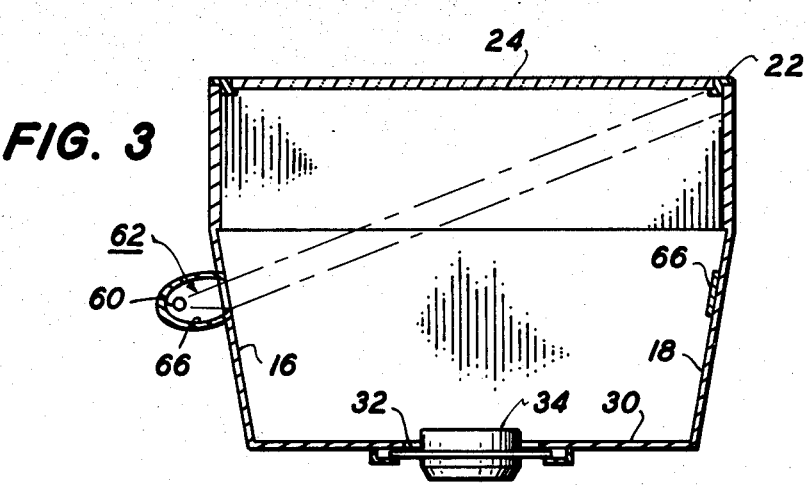
FIG. 3 is a side sectional view of the housing showing an alternate lamp location.

FIG. 3 shows an alternate embodiment of an integrating cavity wherein illumination source 60 of approximately the same dimensions as source 42 is contained within a recess 62 of side wall 16. In this case, the source which again can be a Xenon lamp, would be partially enclosed by a specular reflector 66. If the lamp is sufficiently recessed so that it is not visible from the platen, blocker elements corresponding to 43 and 45 in FIGS. 1 and 2 will not be required. For this configuration, it may be desirable to add a specular reflective strip 68 in wall 18 to achieve the desired irradiation at the platen. Strip 68 can be of brushed aluminum of a height approximately the exit slit of the recess.

From the foregoing, it will be appreciated that integrating cavity 10 is constructed to approximate an integrating sphere and hence is beneficiary to the increase in irradiance which is characteristic of such a construction. The increase is best explained by using, as an example, a point source of radiant energy which is irradiating an elemental surface at some given distance from the source. The irradiation incident upon the surface is of a magnitude $E_o$. If, without changing the intensity of the source or the distance that the elemental surface is positioned from the source, the source is now enclosed within the spherical reflector, a resulting new irradiance, E at the elemental surface is produced. Multiple reflections inside the sphere have greatly increased the irradiance at the elemental surface and a gain factor of E to $E_o$ becomes a function of the average reflectivity of the sphere.

Applying this theoretical analysis to cavity 10, it will become apparent that when source 42 is pulsed and caused to flash, light is directed against the cavity walls, and after undergoing multiple reflections from all interior surfaces, produces a near-uniform diffuse illumination at the platen. Significantly, light reflected from the document itself and not directly entering the lens will undergo additional reflections and contribute further to platen irradiance. The illumination system is thus operated at maximum efficiency permitting the use of much smaller, lower energy flash lamps than were heretofore thought possible.

What is claimed is:

1. A full-frame illumination system for a document copying machine comprising:
    a housing having a top surface defining an object plane and containing a platen supporting a document to be copied, a bottom surface accommodating a lens for focusing an image of a document onto an image plane, said housing completely enclosed by side walls joined to said top and bottom surfaces, said housing further characterized by having its interior surfaces completely covered with a high reflectivity material such that said surfaces are highly diffusely reflective to light incident thereon,
    a single flash illumination source positioned within said housing between said top and bottom surfaces, and
    means to intermittently pulse said illumination source to produce light flashes which undergo multiple reflections from said coated surfaces to provide a uniformly diffuse irradiation at the platen.

2. The illumination system of claim 1 further comprising a first blocking element positioned between the source and the platen of sufficient length and width to prevent direct illumination from the source from reaching any portion of the platen.

3. The illumination system of claims 1 or 2 further including a second blocking element positioned between the source and the lens of sufficient length and width to prevent direct illumination of the lens.

4. the illumination system of claim 3 wherein said first and second blocker element surfaces are coated with a high reflectivity material.

5. The illumination system of claim 3 wherein a first surface of said blocker elements receiving direct light from said source has a specularly reflective surface while the second surface of each blocker is coated with a diffusely reflective material.

6. The illumination system of claim 3 wherein said first and second blocking elements are translucent.

7. The illumination system of claim 1 wherein said illumination source is a Xenon lamp having a length between 12.7 and 17.8 cm.

8. A full-frame, flash illumination system for a document copying machine comprising:
    a housing having a top surface defining an object plane and containing a platen for supporting a document to be copied, a bottom surface accommodating a lens for focusing an image of a document onto an image plane, said housing completely enclosed by side walls joined to said top and bottom surfaces, said housing further characterized by having its interior surfaces completely covered with a high reflectivity material such that said surfaces are higher diffusely reflective to light incident thereon, said housing having a recess in one wall thereof,
    a single flash illumination lamp positioned within said recess whereby direct illumination from said lamp does not reach said platen, and
    means to intermittently pulse said illumination source to produce light flashes which undergo multiple reflections from said coated surfaces to achieve a uniformly diffuse irradiation at the platen.

9. The illumination system of claim 8 wherein the walls of said recess are covered with a specular reflector material.

10. The illumination system of claim 9 wherein the wall opposite said wall containing said recess has coated thereon a specular strip, said strip located so as to specularly reflect direct illumination from said source.

* * * * *